United States Patent
Watanabe

(10) Patent No.: US 12,481,441 B2
(45) Date of Patent: Nov. 25, 2025

(54) MEMORY SYSTEM INCLUDING A NONVOLATILE MEMORY AND A MEMORY CONTROLLER THAT CONTROLS THE NONVOLATILE MEMORY BASED ON PROFILE, AND INFORMATION PROCESSING SYSTEM INCLUDING THE MEMORY SYSTEM

(71) Applicant: Kioxia Corporation, Tokyo (JP)

(72) Inventor: Takumi Watanabe, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/586,337

(22) Filed: Feb. 23, 2024

(65) Prior Publication Data
US 2025/0173077 A1   May 29, 2025

(30) Foreign Application Priority Data
Nov. 29, 2023   (JP) ................. 2023-201532

(51) Int. Cl.
  *G06F 3/06* (2006.01)
(52) U.S. Cl.
  CPC .......... *G06F 3/0634* (2013.01); *G06F 3/0613* (2013.01); *G06F 3/0679* (2013.01)
(58) Field of Classification Search
  CPC ..... G06F 3/0634; G06F 3/0613; G06F 3/0679
  See application file for complete search history.

(56) References Cited

U.S. PATENT DOCUMENTS

| | | |
|---|---|---|
| 7,152,142 B1 | 12/2006 | Guha et al. |
| 7,606,944 B2 | 10/2009 | Kalwitz et al. |
| 10,936,251 B2 | 3/2021 | Cohen et al. |
| 2008/0104386 A1 | 5/2008 | Van Rooyen |
| 2014/0019741 A1* | 1/2014 | Nautiyal ............... G06F 9/4408 713/2 |
| 2017/0269844 A1 | 9/2017 | Paley |
| 2018/0173536 A1* | 6/2018 | Sela ................ G06F 9/441 |
| 2019/0114177 A1* | 4/2019 | Chung ............... G06F 9/4403 |
| 2023/0152993 A1* | 5/2023 | Oh ................ G06F 3/0673 711/154 |
| 2023/0393934 A1* | 12/2023 | Gohain .............. G06F 11/076 |
| 2024/0143337 A1* | 5/2024 | Moshe ............... G06F 9/4401 |
| 2024/0232067 A1* | 7/2024 | Wu ................. G06F 12/0246 |
| 2024/0319916 A1* | 9/2024 | Vuong ............... G06F 3/0679 |

OTHER PUBLICATIONS

Taiwanese Office Action mailed Apr. 28, 2025 in corresponding Taiwanese Patent Application 113131627, 5 pages.

* cited by examiner

*Primary Examiner* — Edward J Dudek, Jr.
(74) *Attorney, Agent, or Firm* — Kim & Stewart LLP

(57) ABSTRACT

A memory system includes a nonvolatile memory that stores a profile table and a memory controller that is configured to control the nonvolatile memory. The profile table includes a plurality of profile information items. The memory controller is configured to control the nonvolatile memory on the basis of first profile information among the plurality of profile information items in a first process among a plurality of processes that are executed during a startup sequence. The first profile information includes a parameter that is referred to when the first process is executed.

16 Claims, 6 Drawing Sheets

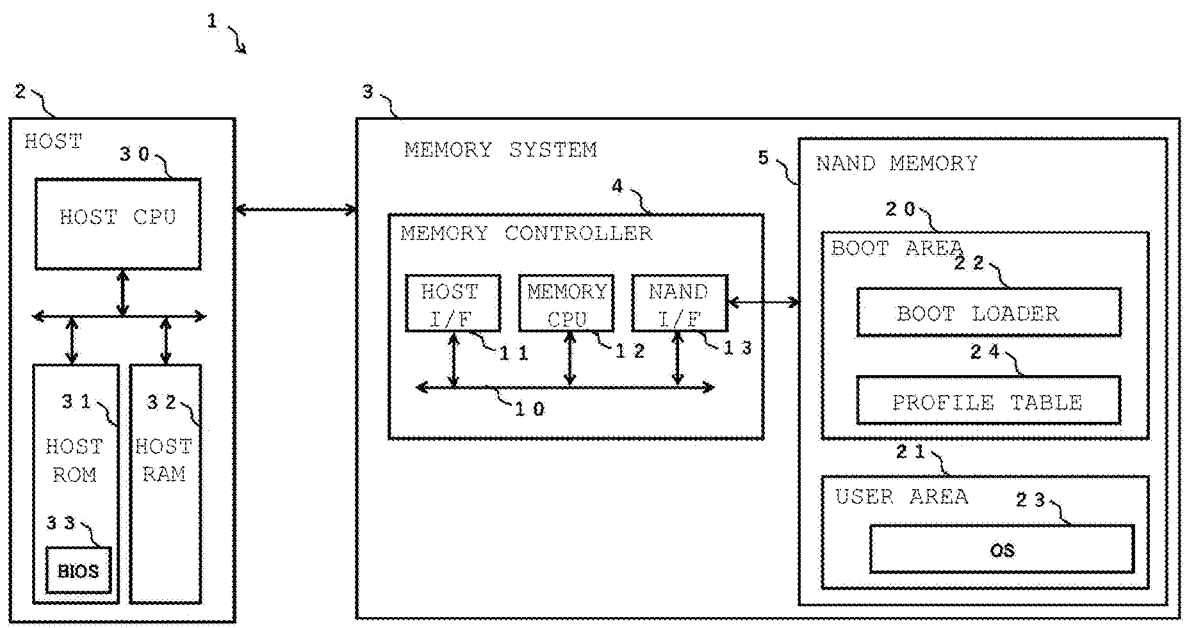

MEMORY SYSTEM INCLUDING A NONVOLATILE MEMORY AND A MEMORY CONTROLLER THAT CONTROLS THE NONVOLATILE MEMORY BASED ON PROFILE, AND INFORMATION PROCESSING SYSTEM INCLUDING THE MEMORY SYSTEM

CROSS-REFERENCE TO RELATED APPLICATION(S)

This application is based upon and claims the benefit of priority from Japanese Patent Application No. 2023-201532, filed Nov. 29, 2023, the entire contents of which are incorporated herein by reference.

FIELD

Embodiments described herein relate generally to a memory system and an information processing system.

BACKGROUND

An information processing system including a memory system and a host connected to the memory system is known. The memory system includes a NAND memory as a semiconductor storage device and a memory controller that controls the semiconductor storage device. Further, the information processing system starts up a basic input/output system (BIOS), starts up a boot loader, and starts up an operating system (OS).

DESCRIPTION OF THE DRAWINGS

FIG. 1 is a block diagram illustrating an example of a configuration of an information processing system including a memory system according to an embodiment.

FIG. 2 is a diagram illustrating an example of a profile table used in the memory system according to the embodiment.

DETAILED DESCRIPTION

Figure 3:
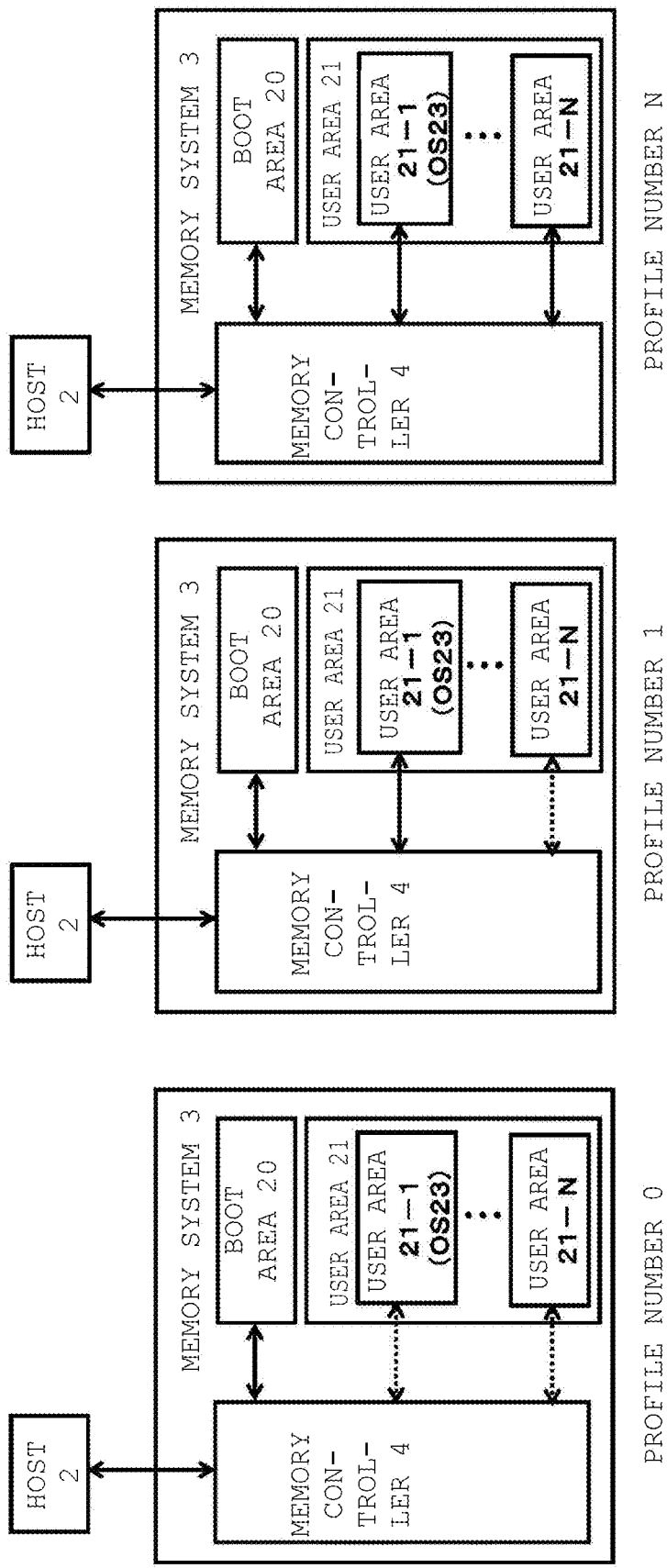
FIG. 3 is a block diagram illustrating a configuration when profile information is applied to the information processing system including the memory system according to the embodiment.

Embodiments provide a memory system that operates with a parameter suitable for startup during startup.

In general, according to one embodiment, a memory system includes a nonvolatile memory and a memory controller configured to control the nonvolatile memory. The nonvolatile memory stores a plurality of profile information items. Each of the plurality of profile information items includes a parameter. When a host starts a startup sequence, the memory controller controls the nonvolatile memory on the basis of first profile information among the plurality of profile information items in a first period of the startup sequence. The first profile information includes a parameter referred to when the nonvolatile memory is controlled in the first period.

FIG. 1 is a block diagram illustrating an example of a configuration of an information processing system 1 including a memory system according to an embodiment of the present disclosure. The information processing system 1 includes a host device 2 (hereinafter, referred to as a host 2) and a memory system 3.

The host 2 is an information processing device external to the memory system 3. The host 2 may be a personal computer, a server, a mobile phone, an imaging device, a mobile terminal, such as a tablet or a smartphone, or an in-vehicle terminal such as a car navigation system.

The memory system 3 is, for example, a storage device that reads data from the nonvolatile memory. The memory system may be implemented as, for example, a solid state drive (SSD). Alternatively, the memory system may be implemented as a hard disk drive (HDD) or a memory card. Here, an example in which the memory system 3 is connected to the host 2 through a cable or a network will be described. Alternatively, the memory system 3 may be provided in the host 2.

The memory system 3 includes a memory controller 4 and a NAND memory 5. The NAND memory 5 is an example of a semiconductor storage device. The semiconductor storage device is an example of a nonvolatile memory that stores data in a nonvolatile manner. The NAND memory 5 is, for example, a NAND flash memory. The NAND flash memory includes a plurality of blocks. Each of the plurality of blocks includes a plurality of memory cells. The block is a unit of data erasure. The block includes a plurality of pages. The page is a unit of data read and write.

The memory controller 4 may be implemented by a circuit such as a system-on-a-chip (SoC). The memory controller 4 is electrically connected to the NAND memory 5 through a NAND interface (I/F) 13.

A memory CPU 12 is a processor that controls a host interface (I/F) 11 and the NAND I/F 13. The memory CPU 12 loads a control program from the NAND memory 5 or a ROM (not illustrated) to a DRAM (not illustrated) and executes the control program to perform various processes. In addition, the control program may be loaded onto a static random access memory (SRAM) (not illustrated) in the memory controller 4. The memory CPU 12 can execute, for example, command processing for processing various commands from the host 2. The operation of the memory CPU 12 is controlled by the control program executed by the memory CPU 12. Further, the operation may be performed by dedicated hardware in the controller 4.

The NAND I/F 13 conforms to, for example, a Toggle NAND flash interface or an open NAND flash interface (ONFI). The NAND I/F 13 is connected to each of a plurality of NAND memory chips in the NAND memory 5 through a plurality of channels (Chs).

The host I/F 11 is a host interface circuit that communicates with the host 2. The host I/F 11 may be, for example, a Serial ATA (SATA) interface, a Serial Attached SCSI (SAS) interface, PCI Express (PCIe)®, or Ethernet®.

The host I/F 11 receives various commands from the host 2. An ATA command defined in an ATA standard is used in the SATA interface. An SCSI command defined in an SCSI standard is used in the SAS interface. An NVMe command defined in an NVM Express (NVMe)® standard is used in PCIe® and Ethernet®.

The NAND memory 5 includes a boot area 20 and a user area 21 that are stored. The boot area 20 includes a boot loader 22.

For example, an OS 23 and user data are stored in the user area 21.

The OS 23 is a program for providing basic functions of the host 2, such as a function of providing an interface, which abstracts various types of hardware, to an application program and a function of managing resources such that processes can be performed independently and efficiently when a plurality of application programs are used at the same time.

The boot loader 22 is a program that is read onto a host RAM 32 by a BIOS 33 and loads a specific program such as the OS 23.

The host 2 includes a host CPU 30, a host ROM 31, and the host RAM 32. The host ROM 31 and the host RAM 32 may be provided in the host CPU 30.

The host CPU 30 is a processor that controls the overall operation of the host 2 and starts up the BIOS 33, the boot loader 22, and the OS 23.

The host ROM 31 includes, for example, data necessary for starting up a program. The host ROM 31 stores the BIOS 33. The BIOS 33 may be a program recorded as a portion of Extensible Firmware Interface (EFI)/Unified Extensible Firmware Interface (UEFI) during manufacture. The BIOS 33 is read by the host CPU 30 as needed, is loaded onto the host RAM 32, and is started up by the host CPU.

The host RAM 32 temporarily stores programs and data and functions as a working memory of the host CPU 30.

The memory system 3 has a profile table 24 provided in the boot area 20 in the NAND memory 5.

The profile table 24 includes a plurality of profile information items. Each of the plurality of profile information items is information for setting a parameter for an item related to the process of the memory system 3. There are a plurality of items related to the process of the memory system 3, and one parameter is set for each item.

The profile table 24 includes a plurality of profile numbers. The profile information corresponds to each of the plurality of profile numbers. The memory controller 4 stores the profile information in the profile table 24 in association with the profile number.

FIG. 2 is a diagram illustrating an example of the profile table 24 owned by the memory system 3.

Each of the plurality of profile information items in the profile table 24 has the parameter to be set for the item related to the process of the memory system 3. FIG. 2 illustrates a case where the items related to the process of the memory system 3 are an access area, an access type, and a speed of the host I/F 11. In FIG. 2, for example, the profile information of profile number 0 indicates that the parameter of the item of the access area is "only boot area", the parameter of the item of the access type is "only read", and the parameter of the item of the host I/F 11 is a "minimum speed". The other items that can be included in the items related to the process of the memory system 3 are, for example, an operation clock of a circuit in the memory system 3, a circuit selected during startup, and the number of cores of the CPU used by the memory controller 4.

In the information processing system 1, a process until the application program or the like can be executed after the information processing system 1 is turned on is referred to as a startup sequence. The startup sequence can be mainly classified into three processes. The three processes are a boot process A, a boot process B, and a post-boot process and are executed in the order of the boot process A, the boot process B, and the post-boot process. A period during which the boot process A is executed is referred to as a boot stage A. A period during which the boot process B is executed is referred to as a boot stage B. A period during which the post-boot process is executed is referred to as a post-boot stage. The boot stage A is also referred to as a first period. The boot stage B is also referred to as a second period. The post-boot stage is also referred to as a third period.

In the boot process A, the host CPU 30 starts up the BIOS 33 and then initializes the memory system 3. The initialization of the memory system 3 by the host CPU 30 means that the host CPU 30 transmits an initialization command to the memory controller 4. In the startup sequence of the information processing system 1, when receiving the initialization command, the memory controller 4 sets the profile information of the selected profile number for each item related to the process of the memory system 3. Here, the setting of the profile information of the profile number means that each of a plurality of parameters corresponding to the selected profile information is set for each item related to the process of the memory system 3. Then, the host CPU 30 reads the boot loader 22 and proceeds to the boot process B.

In the boot process B, the host CPU 30 starts up the boot loader 22 and then initializes the memory system 3. Then, the memory controller 4 selects a profile number corresponding to the boot process B. The memory controller 4 sets the profile information of the selected profile number for each item related to the process of the memory system 3. Then, the host CPU 30 reads the OS 23 and proceeds to the post-boot process.

In the post-boot process, the host CPU 30 starts up the OS 23 and then initializes the memory system 3. The memory controller 4 selects a profile number corresponding to the post-boot process. The memory controller 4 sets the profile information of the selected profile number for each item related to the process of the memory system 3. Then, the post-boot process ends. In the post-boot process, parameters necessary for executing the application program are set.

FIG. 3 is a block diagram illustrating a configuration of the information processing system including the memory system 3 when the process is executed on the basis of the profile information of each profile number. Specifically, FIG. 3 is a block diagram illustrating the configuration of the memory system 3 when the memory system 3 executes the process on the basis of the profile information corresponding to three profile numbers of profile number 0, profile number 1, and profile number N illustrated in FIG. 2. The user area 21 has N user areas 21-1 to 21-N. FIG. 3 illustrates a case where the OS 23 is included in the user area 21-1.

When the memory system 3 executes the process on the basis of the profile information of the profile number 0, the memory controller 4 can access only the boot area 20 of the memory system 3. When the memory system 3 executes the process on the basis of the profile information of the profile number 1, the memory controller 4 can access the boot area 20 and the user area 21-1 of the memory system 3. When the memory system 3 executes the process on the basis of the profile information of the profile number N, the memory controller 4 can access the boot area 20 and all of the user areas 21 of the memory system 3.

In the boot process A, the host 2 requests the memory system 3 to read the boot loader 22 in the boot area 20. That is, in the boot process A, the memory controller 4 may access the boot area 20. Therefore, in the boot stage A, the memory system 3 may execute the process on the basis of the profile information of the profile number 0.

In the boot process B, the host 2 requests the memory system 3 to read the OS 23 in the user area 21. That is, in the boot process B, the memory controller 4 may access the user area 21-1. Therefore, in the boot stage B, the memory system 3 may execute the process on the basis of the profile information of the profile number 1.

When the post-boot process is ended and the information processing system 1 executes the application program, the host 2 is likely to issue a read and write request for any area in the user area 21. Therefore, in the post-boot stage, the memory system 3 may execute the process on the basis of the profile information of the profile number N.

An information processing system including a memory system that does not include the profile table 24 sets certain parameters for items related to the process of the memory system and operates. Here, the certain parameters refer to parameters set for the items related to the process of the memory system in the post-boot stage of the memory system 3. Therefore, in the information processing system including the memory system that does not include the profile table, the memory controller can access any area in the user area even immediately after the BIOS is started up. The information processing system including the memory system that does not include the profile table can issue a read and write request for any area in the user area. In addition, the memory system that does not include the profile table can communicate with the host at the maximum speed. That is, it is considered that the information processing system including the memory system that does not include the profile table operates with performance more than necessary, which results in excessive power consumption and an increase in the startup time.

According to the first embodiment, in the startup sequence of the memory system 3, since the memory system 3 has the profile table 24, the memory system 3 can operate with performance suitable for each process of the startup sequence. Therefore, the effect of reducing the power consumption of the memory system 3 and reducing the startup time can be expected as compared to the information processing system that does not include the profile table.

Figure 4:
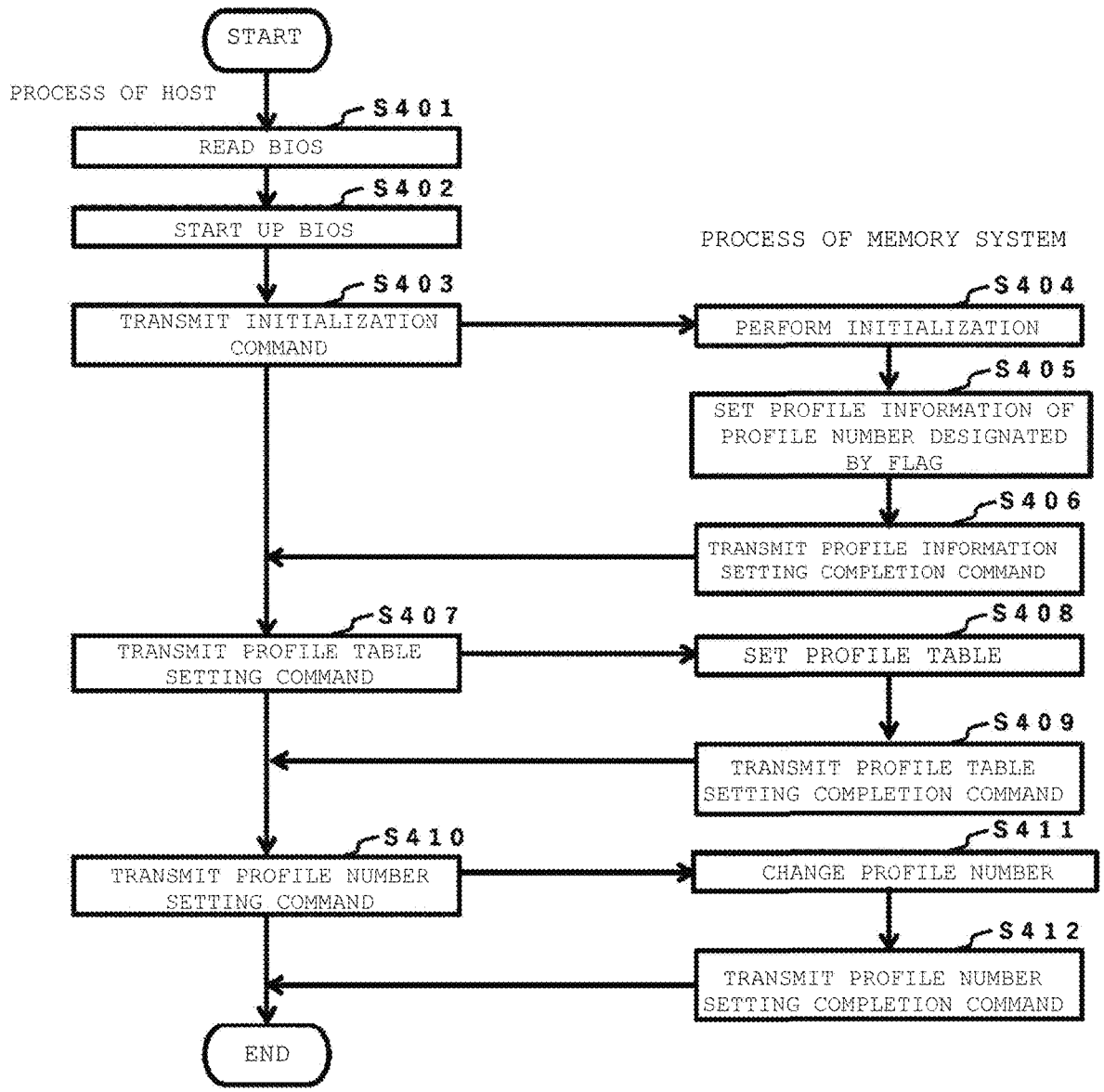
FIG. 4 is a diagram illustrating a processing procedure in a profile table setting process of the information processing system including the memory system according to the embodiment.

FIG. 4 is a diagram illustrating an example of a process of setting the profile information in the profile table 24 in the information processing system 1 including the memory system 3. FIG. 4 illustrates a process of setting the profile information necessary for each process of the startup sequence in the profile table 24 when a vendor of the information processing system 1 who purchased the memory system 3 starts up the information processing system 1 for the first time. In addition, the series of processes illustrated in FIG. 4 is referred to as a profile table setting process.

The profile table setting process can be performed without being limited to when the information processing system 1 is started up for the first time.

The memory system 3 has a flag in the NAND memory 5. This flag designates the profile number selected by the memory system 3. In addition, the profile table 24 has profile information corresponding to profile number S. When the vendor of the information processing system 1 purchases the memory system 3, the memory system 3 has a flag designating the profile number S. Therefore, when the information processing system 1 is started up for the first time, the memory system 3 executes the process on the basis of the profile information of the profile number S.

Hereinafter, a flowchart illustrated in FIG. 4 will be described.

When the information processing system 1 is turned on, the host CPU 30 reads the BIOS 33 from the host ROM 31 (Step S401). The host CPU 30 starts up the BIOS 33 (Step S402).

The host CPU 30 transmits an initialization command to the memory controller 4 (Step S403). When receiving the initialization command, the memory controller 4 initializes the memory system 3 (Step S404). The memory controller 4 checks the profile number designated by the flag. The memory controller 4 sets the profile information of the designated profile number (in this case, the profile number S) for each item related to the process of the memory system 3 (Step S405). When the setting of the profile information is completed, the memory controller 4 transmits a profile information setting completion command to the host 2 (Step S406).

The host CPU 30 transmits a profile table setting command to the memory controller 4 (Step S407). This command includes the profile information of each of at least three profile numbers of profile number K, profile number M, and profile number N. It is assumed that the profile number of the profile information executed in the boot process A is K, the profile number of the profile information executed in the boot process B is M, and the profile number of the profile information executed in the post-boot process is N. S, K, M, and N are different natural numbers.

The memory controller 4 sets at least three profile information items in the profile table 24 of the memory system 3 (Step S408). When the setting is completed, the memory controller 4 transmits a profile table setting completion command to the host 2 (Step S409).

The host 2 transmits a command to set the profile number designated by the flag to K to the memory controller 4 (Step S410). The memory controller 4 changes the profile number designated by the flag to K (Step S411). The memory controller 4 transmits a profile number setting completion command to the host 2 (Step S412), and the profile table setting process of the information processing system 1 ends.

The transition of the profile number designated by the flag in the profile table setting process of the information processing system 1 will be described. When the profile table setting process is started, the profile number designated by the flag is S. The profile number designated by the flag is changed from S to K by the process (Step S411) of changing the profile number designated by the flag to K.

The transition of the profile number of the profile information referred to by the memory system 3 in the profile table setting process of the information processing system 1 will be described. The memory controller 4 sets the profile information of the profile number S for each item related to the process of the memory system 3 (Step S405). The subsequent process of the memory system 3 is executed on the basis of the profile information of the profile number S.

When the profile table setting process of the information processing system 1 is ended and the information processing system 1 is started up, the memory system 3 starts the startup sequence from the boot process A. When the boot process A is started, the profile number designated by the flag is K. Therefore, the memory system 3 executes the boot process A on the basis of the profile information of the profile number K.

FIG. 4 illustrates a process in a case where the vendor of the information processing system 1 who purchased the memory system 3 sets the profile information of the profile numbers K, M, and N in the profile table 24 and sets the profile number designated by the flag to K. It is noted that, before the vendor of the information processing system 1 purchases the memory system 3, the profile table 24 may have the profile information of the profile numbers K, M, and N. In this case, when the vendor of the information processing system 1 purchases the memory system 3, the memory system 3 may have the flag designating the profile number K. When the profile table 24 has the profile information of the profile numbers K, M, and N and the memory system 3 has the flag designating the profile number K, the information processing system 1 may not perform the profile table setting process.

Figure 5:
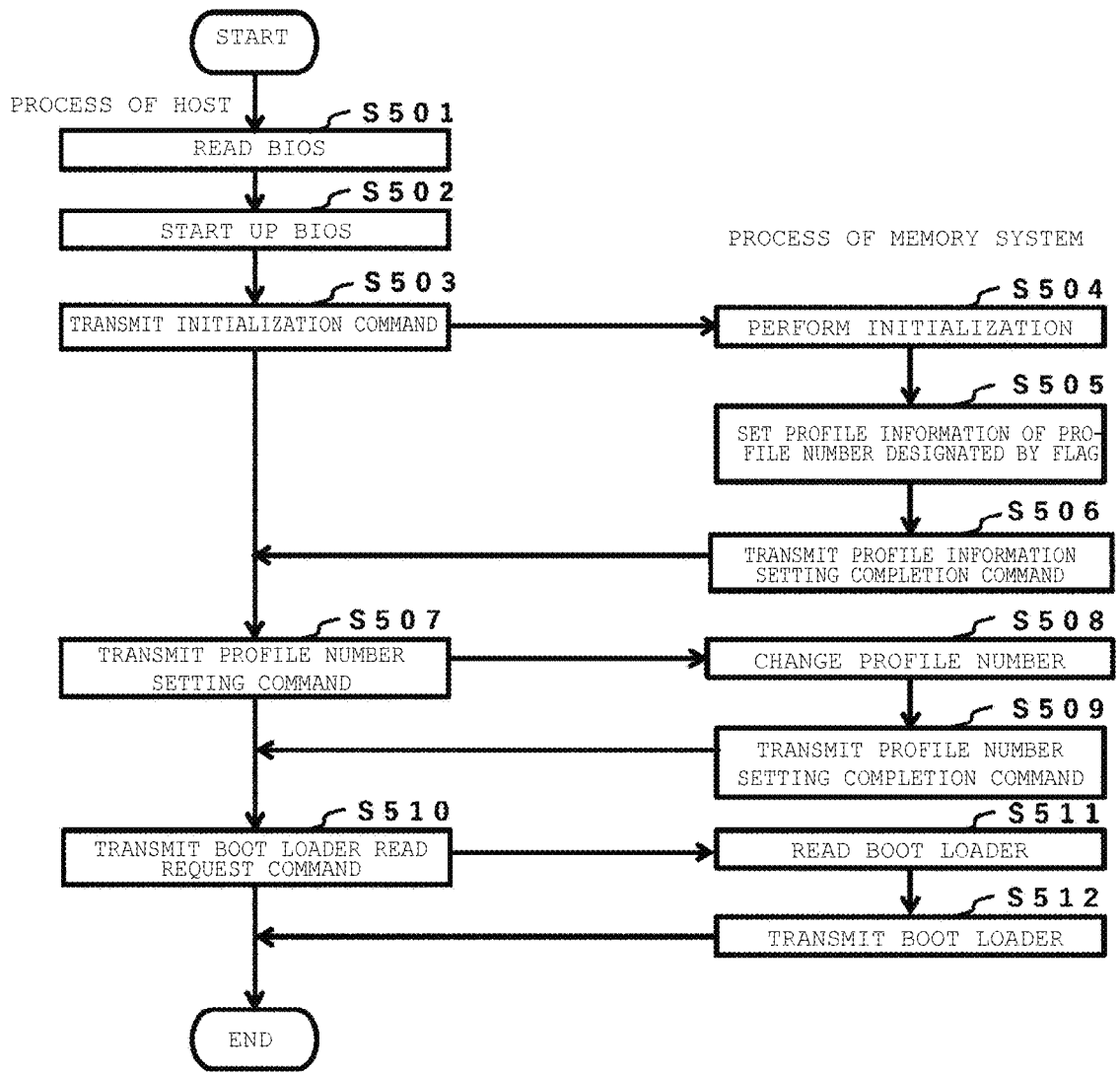
FIG. 5 is a diagram illustrating a processing procedure in a boot process A of the information processing system including the memory system according to the embodiment.

FIG. 5 is a diagram illustrating an example of the boot process A of the information processing system 1. It is assumed that the profile table 24 has the profile information of the profile numbers K, M, and N and the memory system 3 has the flag designating the profile number K. When the information processing system 1 is turned on, the boot process A of the information processing system 1 is started. FIG. 5 illustrates an example of the boot process A. When the boot process A is completed, the boot process B illustrated in FIG. 6 which will be described below and the post-boot process illustrated in FIG. 7 which will be described below follow, and the startup sequence is completed.

Hereinafter, a flowchart illustrated in FIG. 5 will be described.

When the information processing system 1 is turned on, the host CPU 30 reads the BIOS 33 from the host ROM 31 (Step S501). The host CPU 30 starts up the BIOS 33 (Step S502).

The host CPU 30 transmits an initialization command to the memory controller 4 (Step S503). When receiving the initialization command, the memory controller 4 initializes the memory system 3 (Step S504). The memory controller 4 checks the profile number designated by the flag. The memory controller 4 sets the profile information of the designated profile number (in this case, the profile number K) for each item related to the process of the memory system 3 (Step S505). When the setting of the profile information is completed, the memory controller 4 transmits a profile information setting completion command to the host 2 (Step S506).

The host 2 transmits a command to set the profile number designated by the flag to M to the memory controller 4 (Step S507). The memory controller 4 changes the profile number designated by the flag to M (Step S508). The memory controller 4 transmits a profile number setting completion command to the host 2 (Step S509).

The host CPU 30 transmits a command to request the reading of the boot loader 22 to the memory controller 4 (Step S510). The memory controller 4 receives the command and reads the boot loader 22 (Step S511). The memory controller 4 transmits the read boot loader 22 to the host 2 (Step S512), and the host 2 receives the boot loader 22 and ends the boot process A.

The transition of the profile number designated by the flag in the boot process A of the information processing system 1 will be described. When the boot process A is started, the profile number designated by the flag is K. The profile number designated by the flag is changed from K to M by the process (Step S508) of changing the profile number designated by the flag to M.

When the boot process A is completed, the information processing system 1 starts the boot process B. When the boot process B is started, the profile number designated by the flag is M. The memory system 3 executes the boot process B on the basis of the profile information of the profile number M.

It is noted that, the step (S510) in which the host CPU 30 transmits the command to request the reading of the boot loader 22 to the memory controller 4 may be performed at any time after the step (S506) in which the memory controller 4 transmits the profile information setting completion command to the host 2 is completed and during the boot process A.

Figure 6:
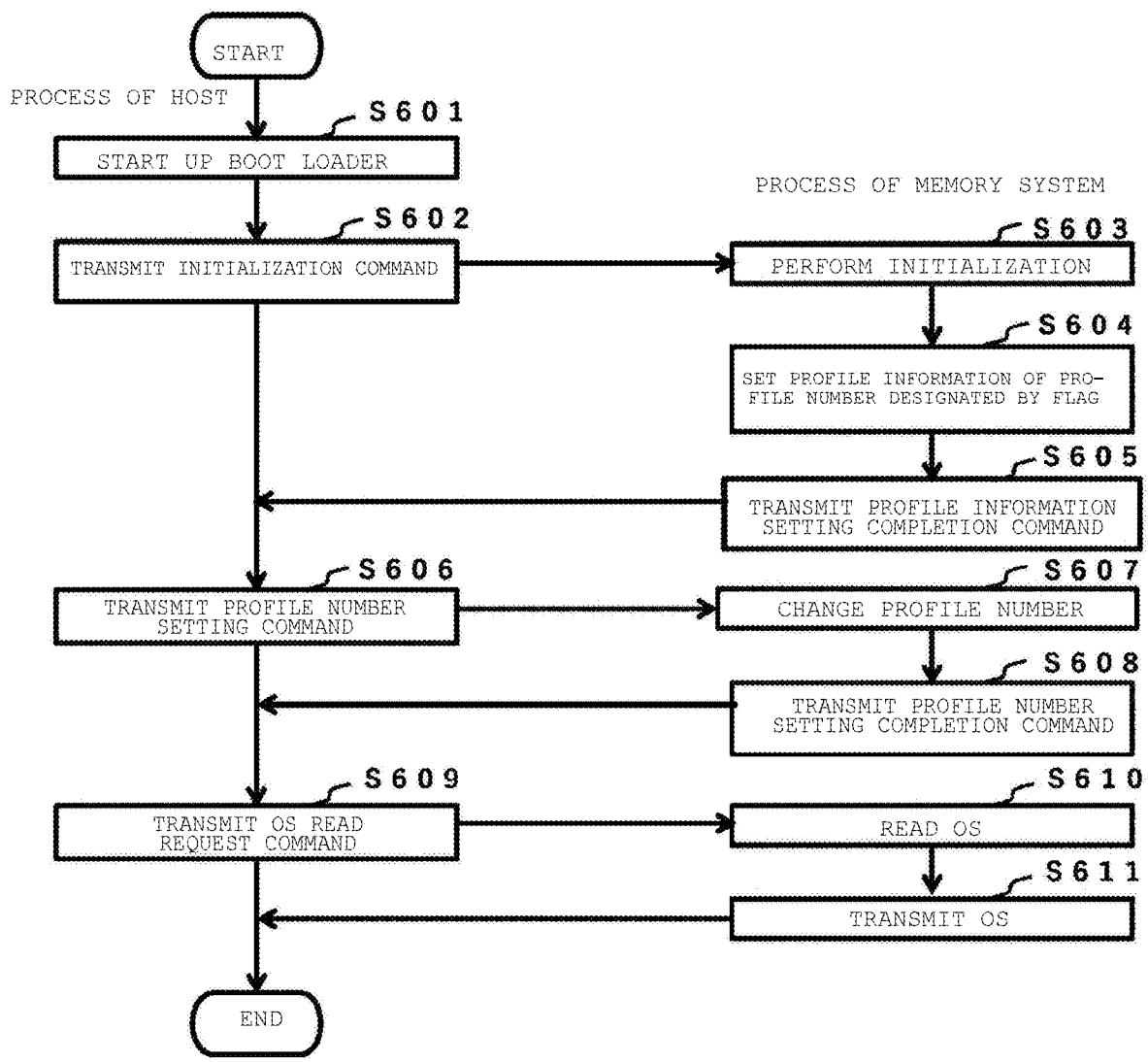
FIG. 6 is a diagram illustrating a processing procedure in a boot process B of the information processing system including the memory system according to the embodiment.

FIG. 6 is a diagram illustrating an example of the boot process B of the information processing system 1. Subsequent to the boot process A illustrated in FIG. 5, the boot process B illustrated in FIG. 6 is performed.

Hereinafter, a flowchart illustrated in FIG. 6 will be described.

The host CPU 30 starts up the boot loader 22 (Step S601).

The host CPU 30 transmits an initialization command to the memory controller 4 (Step S602). When receiving the initialization command, the memory controller 4 initializes the memory system 3 (Step S603). The memory controller 4 checks the profile number designated by the flag. The memory controller 4 sets the profile information of the designated profile number (in this case, the profile number M) for each item related to the process of the memory system 3 (Step S604). When the setting of the profile information is completed, the memory controller 4 transmits a profile information setting completion command to the host 2 (Step S605).

The host 2 transmits a command to set the profile number specified by the flag to N to the memory controller 4 (Step S606). The memory controller 4 changes the profile number designated by the flag to N (Step S607). Then, the memory controller 4 transmits a profile number setting completion command to the host 2 (Step S608).

The host CPU 30 transmits a command to request the reading of the OS 23 to the memory controller 4 (Step S609). The memory controller 4 receives the command and reads the OS 23 (Step S610). The memory controller 4 transmits the OS 23 to the host 2 (step S611), and the host 2 receives the OS 23. Then, the boot process B ends.

The transition of the profile number designated by the flag in the boot process B of the information processing system 1 will be described. When the boot process B is started, the profile number designated by the flag is M. The profile number designated by the flag is changed from M to N by the process (Step S607) of changing the profile number designated by the flag to N.

When the boot process B is ended, the information processing system 1 starts the post-boot process. When the post-boot process is started, the profile number designated by the flag is N. Therefore, the memory system 3 executes the post-boot process on the basis of the profile information of the profile number N.

It is noted that, the step (S609) in which the host CPU 30 transmits the command to request the reading of the OS 23 to the memory controller 4 may be performed at any time after the step (S605) in which the memory controller 4 transmits the profile information setting completion command to the host 2 and during the boot process B.

Figure 7:
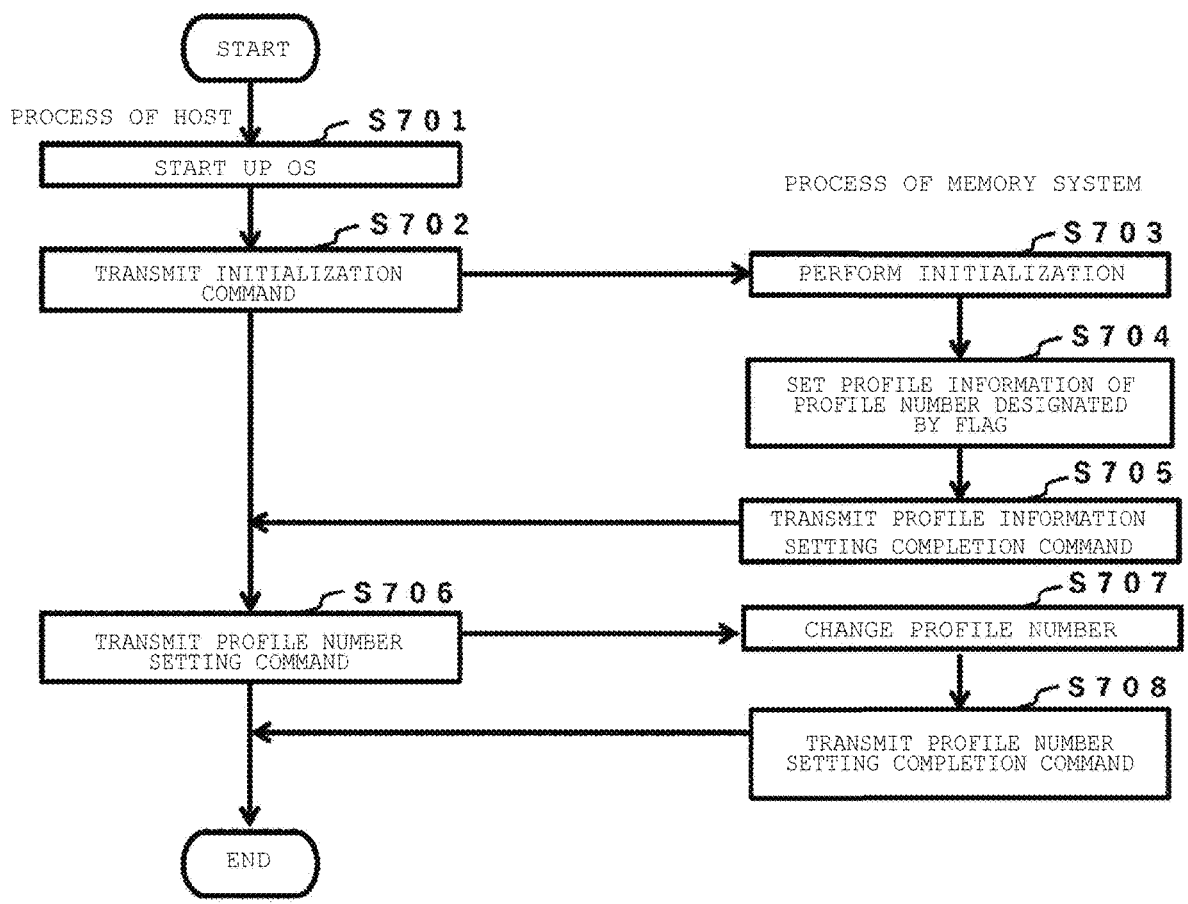
FIG. 7 is a diagram illustrating a processing procedure in a post-boot process of the information processing system including the memory system according to the embodiment.

FIG. 7 is a diagram illustrating an example of the post-boot process of the information processing system 1. Subsequent to the boot process B illustrated in FIG. 6, the post-boot process illustrated in FIG. 7 is performed.

Hereinafter, a flowchart illustrated in FIG. 7 will be described.

The host CPU 30 starts up the OS 23 (S701).

The host CPU 30 transmits an initialization command to the memory controller 4 (S702). When receiving the initialization command, the memory controller 4 initializes the memory system 3 (S703). The memory controller 4 checks the profile number designated by the flag. The memory controller 4 sets the profile information of the designated profile number (in this case, the profile number N) for each item related to the process of the memory system 3 (Step S704). When the setting of the profile information is completed, the memory controller 4 transmits a profile information setting completion command to the host 2 (Step S705).

The host 2 transmits a command to set the profile number designated by the flag to K to the memory controller 4 (Step S706). The memory controller 4 changes the profile number designated by the flag to K (Step S707). Then, the memory controller 4 transmits a profile number setting completion command to the host 2 (Step S708), and the post-boot process ends.

The transition of the profile number designated by the flag in the post-boot process of the information processing system 1 will be described. When the post-boot process is started, the profile number designated by the flag is N. The profile number designated by the flag is changed from N to K by the process (Step S707) of changing the profile number designated by the flag to K.

After the post-boot process is ended, for example, the information processing system 1 executes any application program. At this time, the memory system 3 executes the process on the basis of the profile information of the profile number N.

When the information processing system 1 is turned off and then turned on, the memory system 3 starts the startup sequence from the boot process A. When the boot process A is started, the profile number designated by the flag is K. Therefore, the memory system 3 executes the boot process A on the basis of the profile information of the profile number K.

In the information processing system including the memory system that does not include the profile table 24, when a parameter set for an item related to hardware, such as an operation clock, is changed during the operation of the memory system, it is necessary to temporarily stop the memory system in operation. Therefore, there is a possibility that the operation of the memory system will be unstable. Further, a circuit for temporarily stopping and resuming the operation of the memory system is required, which results in an increase in circuit size.

According to this embodiment, the memory system 3 sets a parameter for each item related to the process of the memory system 3 at the timing when the memory system 3 is initialized and changes the parameter. Therefore, the memory system 3 can stably change even items related to the setting of hardware.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, the memory system comprising:

a nonvolatile memory; and a memory controller configured to control the nonvolatile memory, wherein the nonvolatile memory stores a plurality of profile information items, each of the plurality of profile information items includes a parameter, the memory controller controls the nonvolatile memory on the basis of first profile information among the plurality of profile information items in a first period of a startup sequence, and on the basis of second profile information different from the first profile information among the plurality of profile information items in a second period following the first period, the first profile information includes a parameter referred to when the nonvolatile memory is controlled in the first period, and the second profile information includes a parameter referred to when the nonvolatile memory is controlled in the second period, the parameter of the first profile information, which is referred to when the nonvolatile memory is controlled in the first period, indicates that a first region of the nonvolatile memory storing a boot loader and the plurality of profile information items is accessible but a second region of the nonvolatile memory storing an operating system is not accessible, and the parameter of the second profile information, which is referred to when the nonvolatile memory is controlled in the second period, indicates that both the first region of the nonvolatile memory and the second region of the nonvolatile memory are accessible.

2. The memory system according to claim 1, wherein the first profile information is capable of being set from the host.

3. The memory system according to claim 1, wherein the memory controller receives a first command from the host in the first period, initializes the memory system in response to the first command, and controls the nonvolatile memory on the basis of the first profile information.

4. The memory system according to claim 1, wherein the memory controller receives a second command from the host in the second period, initializes the memory system in response to the second command, and controls the nonvolatile memory on the basis of the second profile information.

5. The memory system according to claim 1, wherein the memory controller sets a flag designating the second profile information used in the second period in the nonvolatile memory in the first period, checks the flag in the second period, and controls the nonvolatile memory on the basis of the second profile information.

6. The memory system according to claim 1, wherein
another parameter of the first profile information, which is referred to when the nonvolatile memory is controlled in the first period, indicates that an interface to the host is to be operated at a first speed, and
another parameter of the second profile information, which is referred to when the nonvolatile memory is controlled in the second period, indicates that the interface to the host is to be operated at a second speed that is faster than the first speed.

7. A memory system connectable to a host, the memory system comprising:

a nonvolatile memory; and a memory controller configured to control the nonvolatile memory, wherein the nonvolatile memory stores first profile information including a parameter referred to by the memory controller in a first period in a startup sequence, second profile information including a parameter referred to by the memory controller in a second period that is different from the first period in the startup sequence and starts following the first period, third profile information including a parameter referred to by the memory controller in a third period different from the second period in the startup sequence, and a flag designating the first profile information, when receiving a first command from the host in the first period, the memory controller initializes the memory system, checks the flag, and controls the nonvolatile memory on the basis of the first profile information and to change the flag to a flag designating the second profile information, and when receiving a second command from the host in the second period, the memory controller initializes the memory system, checks the flag, and controls the nonvolatile memory on the basis of the second profile information and to change the flag to a flag designating the third profile information.

8. The memory system according to claim 7, wherein the third period starts following the second period, and when receiving a third command from the host in the third period, the memory controller initializes the memory system, checks the flag, and controls the nonvolatile memory on the basis of the third profile information and to change the flag to the flag designating the first profile information.

9. An information processing system comprising:
a memory system according to claim 7; and
a host connected to the memory system.

10. A memory system connectable to a host, the memory system comprising:
a nonvolatile memory; and
a memory controller configured to control the nonvolatile memory, wherein
the nonvolatile memory includes a plurality of profile information items,
each of the plurality of profile information items includes a parameter,
the memory controller controls the nonvolatile memory on the basis of first profile information among the plurality of profile information items in response to a first command from the host, controls the nonvolatile memory on the basis of second profile information different from the first profile information among the plurality of profile information items in response to a second command from the host, and controls the nonvolatile memory on the basis of third profile information different from the first profile information and the second profile information among the plurality of profile information items in response to a third command from the host, and the host executes a startup sequence during startup, transmits the first command to the memory system in a first period of the startup sequence, transmits the second command to the memory system in a second period of the startup sequence following the first period, and transmits the third command to the memory system in a third period of the startup sequence following the second period.

11. The memory system according to claim 10, wherein the memory controller receives the second command after the first command and receives the third command after the second command.

12. The memory system according to claim 10, wherein the memory controller is able to access a larger area of the nonvolatile memory when controlling the nonvolatile memory on the basis of the second profile information than when controlling the nonvolatile memory on the basis of the first profile information, and when controlling the nonvolatile memory on the basis of the third profile information than when controlling the nonvolatile memory on the basis of the second profile information.

13. The memory system according to claim 12, wherein the memory controller access to the area of the nonvolatile memory when controlling the nonvolatile memory on the basis of the first profile information or the second profile information is read-only access, and the memory controller access to the area of the nonvolatile memory when controlling the nonvolatile memory on the basis of the third profile information is read access or write access.

14. The memory system according to claim 13, wherein a first area of the nonvolatile memory where a boot loader is stored is not readable by the memory controller when controlling the nonvolatile memory on the basis of the first profile information, and a second area of the nonvolatile memory where an operating system is stored is not readable by the memory controller when controlling the nonvolatile memory on the basis of the first profile information or the second profile information.

15. The memory system according to claim 10, wherein the memory controller operates an interface to the host at a faster speed when controlling the nonvolatile memory on the basis of the third profile information than when controlling the nonvolatile memory on the basis of the first profile information or the second profile information.

16. The memory system according to claim 15, wherein the memory controller operates the interface to the host at the same speed when controlling the nonvolatile memory on the basis of the first profile information and the second profile information.

\* \* \* \* \*